United States Patent [19]

Clark

[11] Patent Number: 4,974,637
[45] Date of Patent: Dec. 4, 1990

[54] SELF DRAINING VALVE

[76] Inventor: Garfield Clark, 111 Davis Dr., Roanoke, Ala. 36274

[21] Appl. No.: 419,026

[22] Filed: Oct. 10, 1989

[51] Int. Cl.⁵ .......................................... F16K 11/076
[52] U.S. Cl. .............................. 137/625.24; 137/302
[58] Field of Search ..................... 137/625.22, 625.24, 137/302

[56] References Cited

U.S. PATENT DOCUMENTS

| | | | |
|---|---|---|---|
| 450,763 | 4/1891 | Van Wie | 137/625.22 |
| 1,561,736 | 11/1925 | Menige | 137/302 |
| 1,765,139 | 6/1930 | Dyck | 137/625.22 |
| 2,123,655 | 7/1938 | McDougal | 137/625.22 |
| 2,319,347 | 5/1943 | Reed | 137/625.24 |
| 3,080,146 | 3/1963 | Lombardi | 251/310 |
| 3,229,720 | 1/1966 | Hirschowitz | 137/625.22 |
| 3,480,042 | 11/1969 | Mueller | 137/625.22 |

Primary Examiner—Alan Cohan
Attorney, Agent, or Firm—Michael C. Smith

[57] ABSTRACT

A self draining valve having a valve housing with a fluid entrance channel, a fluid exit passageway leading toward the direction of normal flow of fluid, and a fluid drain channel leading in a direction inconsistent with the normal flow of fluid; a cylindrical inner valve member rotatably positioned within the valve housing; and two continuous o-ring type seals positioned between the inner surface of the valve housing, and the outer surface of the inner valve member.

3 Claims, 1 Drawing Sheet

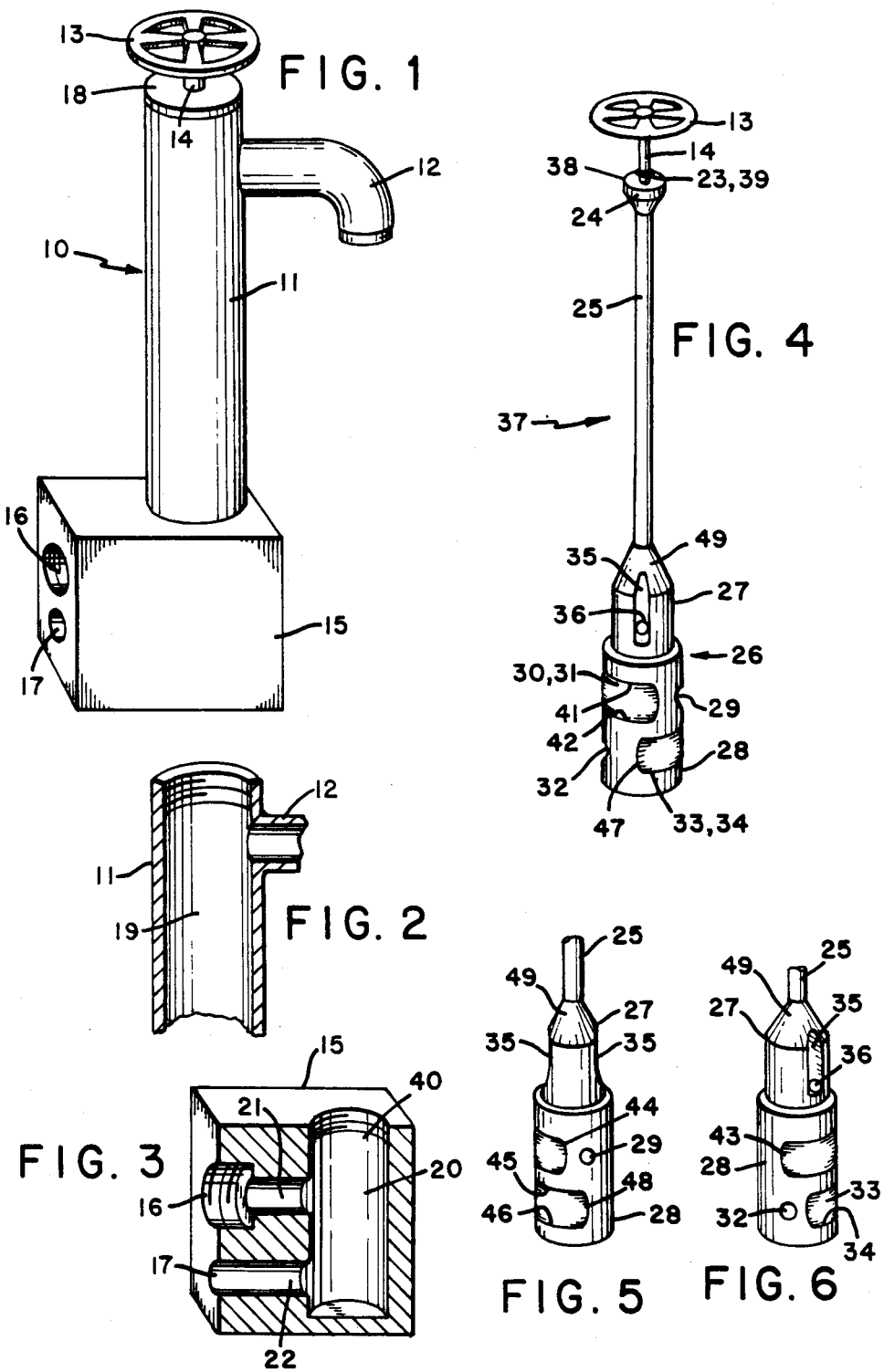

SELF DRAINING VALVE

TECHNICAL FIELD

The present invention relates generally to plumbing, and specifically to valves, and more specifically to a self draining valve having two O-ring seals.

BACKGROUND ART

Self draining valves are well known in the art. Examples are shown in U.S. Pat. Nos. 1,765,139; 2,123,655 and 3,229,720. An example of an O-ring used with a valve is shown in U.S. Pat. No. 3,480,042.

While the varieties of valves in the prior art are apparently suited for their particular purposes, until the present invention there have been no double O-ring sealed self draining valves for use in draining fluid from the valve to allow for various purposes such as preventing a liquid from freezing in the valve or in the line adjacent to the valve.

It is for this reason that the present self draining valve was invented.

DISCLOSURE OF INVENTION

The present invention promotes evacuation of a fluid from a valve and from areas in communication with the valve. The present invention is a self draining valve having an off position, an on position and a drain position. While the valve is suitable for a variety of fluids, including liquids and gases, a major use is with an outdoor water faucet.

Thus, a primary object of the present invention is to provide a self draining valve for fluids.

Another major object of this invention is to provide an outdoor self draining water valve which reduces the possibility of damage from frozen water in plumbing.

BRIEF DESCRIPTION OF THE DRAWINGS

While the specification concludes with claims particularly pointing out and distinctly claiming the subject matter which is regarded as the invention, it is believed that the invention, objects, features, and advantages thereof will be better understood from the following description taken in connection with the accompanied drawings in which like parts are given like identification numerals and wherein:

FIG. 1 is a perspective view of a freeze resistant faucet incorporating the present invention;

FIG. 2 is a cross sectional view of the water pipe and spout of the faucet;

FIG. 3 is a cross sectional view of the valve housing;

FIG. 4 is a perspective view of the interior valve memeber showing a front view of the faucet aperture;

FIG. 5 is a perspective view of the lower portion of the interior valve member showing a front view of the water inlet aperture; and FIG. 6 is a perspective view of the lower portion of the interior valve member showing a front view of the drain aperture.

BEST MODE FOR CARRYING OUT THE INVENTION

While there are various ways of preventing freezing of water plumbing, the method used in connection with the present invention is called the self draining method. This method is illustrated in FIG. 1 which shows the self draining valve generally at 10.

For purposes of this specification, the term fluid includes both liquids and gases. The present self draining valve is adapted to operate in a variety of fluid systems, but is specifically discussed herein primarily as a part of a water system.

As FIG. 1 of the drawings illustrates, the preferred embodiment of the present self draining valve 10 is incorporated into a freeze resistant faucet indicated generally at 10. While the invention may have a multiplicity of applications with various fluids, the faucet 10 is an out door type faucet, the bottom of which is normally buried below ground level. It comprises an elongated vertical water pipe 11 having a spout 12 through which the water may exit for use; a valve housing 15 located at the bottom of the pipe 11 and having a water entrance aperture 16 through which water is received from a water supply, and a valve drain aperture 17 through which water may be drained from the interior of the faucet 10. Above the water pipe 11 is a rotatable control handle 13 used to rotate shaft 14 to control the positions of the valve 10; off, on, or drain as will be explained below. Cap 18 encircles shaft 14 and seals the top of pipe 11.

As FIG. 2 shows, the elongated water pipe 11 has a hollow core 19 which leads to spout 12. The top of the hollow core 19 of the pipe 11 may be threaded as shown to receive cap 18 of FIG. 1 in a sealing relationship.

FIG. 3 is a cross section of the valve housing 15 which has a generally vertical, cylindrical valve chamber 20 which cooperates with the interior valve member 37 which will be discussed below. The top interior portion of valve chamber 20 may be threaded as shown to receive the lower portion of the elongated water pipe 11 in a sealing relationship. Near the bottom of valve chamber 20, a generally horizontal drain channel 22 leads to the valve drain aperture 17. Above the drain channel 22, a generally horizontal inlet channel 21 leads from the water entrance aperture 16 to the valve chamber 20. The water entrance aperture 16 may be threaded, as shown, to receive a water supply line.

The interior valve member 37 is shown in FIGS. 4, 5, and 6. In FIG. 4, the interior valve member 37 is a rigid extension of the bottom of the elongated shaft 25, which is a rigid continuation of shaft 14. Near the top of shaft 25 is an enlarged alignment bearing 24 which has a lateral peripherial surface 38, concentric with the longitudinal axis of shafts 14 and 25, which comes into aligning contact with the interior walls of the core 19 of pipe 11. Above bearing 24, circular groove 39 is formed in the surface of shaft 14 to hold a circular o-ring 23 which cooperates with cap 18 to seal the space between the shaft 14 and the cap 18.

The lower portion of interior valve member 37 is a valve column 26 comprising a tapered, cylindrical upper member 27 and a slightly larger cylindrical lower member 28. The lateral space between the outer surfaces of the upper member 27 and the outer surfaces of the lower member 28, is occupied by the lower portion of the pipe 11 when the faucet 10 is asssembled, thereby maintaining the members 26 and 27 in correct alignment.

Discussing the lower member 28 first, it can be seen in FIG. 4 that a lower drain aperture 32 leads into a hollow central portion of lower member 28, thereby allowing water to drain from within the lower member 28 when the handle 13 is rotated to a drain position which aligns lower drain aperture 32 with drain channel 22 and valve drain aperture 17 of FIG. 2. When lower member 28 is rotated out of drain position, the adjacent elongated drain seal groove 34 formed in the surface of lower member 28 and the drain seal o-ring 33 placed in said groove 34 rotate into position near drain channel 22 with some portion of drain seal o-ring 33 encircling the periphery of the interior portion of drain channel 22 to form a seal between the valve housing 15 and the valve column 26 to prevent water from draining from the faucet 10.

Above the groove 34 and o-ring 33 is a water inlet aperture 29 which leads into a hollow central portion of lower member 28, thereby allowing water to enter the lower member 28 and flow toward the spout 12 when the handle 13 is rotated to an on position which aligns water inlet aperture 29 with inlet channel 21 and water entrance aperture 16 of the housing 15. When lower member 28 is rotated out of on position, the adjacent elongated water inlet seal groove 31 formed in the surface of lower member 28 and the water inlet seal o-ring 30 placed in said groove 31 rotate into position near water inlet channel 21 with some portion of water inlet seal o-ring 30 encircling the periphery of the interior portion of inlet channel 21 to form a seal between the valve housing 15 and the valve column 26 to prevent water from draining from the faucet 10. When the handle is rotated to an off position, both the inlet channel 21 and the drain channel 22 are sealed.

Moving now to the upper member 27, it can be seen in FIG. 4 and in FIG. 6 that upper member 27 is cylindrical at its lower end and tapers at its upper end into contact with shaft 25. Faucet channels 35 formed on opposite sides of upper member 27 are generally vertical channels which terminate at the top at the tapered portion of the upper member 27, and terminate at the bottom in the cylindrical lower portion. Each faucet channel 35 has a faucet aperture 36 formed in its lower portion, leading into the hollow core of the valve column 26.

In operation, the faucet 10 is turned to an on position which aligns water inlet aperture 29 with inlet channel 21. Water then flows from a remote supply through water entrance aperture 16, through inlet channel 21, through water inlet aperture 29, and into the hollow interior of valve column 26. The water continues up through valve column 26, exits column 26 through faucet apertures 36 and ascends through faucet channels 35 into the hollow core 19 of the elongated water pipe 11, surrounds elongated shaft 25 and flows up to about alignment bearing 24 where it exits the faucet 10 through spout 12.

To drain the faucet 10 to, prevent freezing, the handle 13, shaft 14, elongated shaft 25 and valve column 26 are rotated to drain position with drain aperture 32 aligned with drain channel 22. The water may then flow by gravity down the hollow core 19 of water pipe 11, down faucet channels 35, through faucet apertures 36, through valve column 26, through drain aperture 32, through drain channel 22, and through valve drain aperture 17, out of the valve housing 15.

As FIGS. 4, 5 and 6 show, the drain position seals inlet channel 21 by seal 30, the on position seals the drain channel 22 by seal 33, and in the off position, approximately half of the way between on and drain, seals 30, 33 seal both the inlet channel 21 and the drain channel 22. The grooves 31, 34 formed in the peripheral surface of lower member 28 are each elongated over an arc of about 180 angular degrees, each covering about half of the circumference of the lower number 28 as shown. Each groove 31, 34 has an elongated top, an elongated bottom and rounded sides. The top portion of each groove and the bottom portion of each groove are generally horizontal and parallel to each other and are separated by a distance significantly greater than the diameter of the aperture of the channel 21, 22 with which it works to seal as previously discussed.

In summary, this invention is a self-draining fluid control valve 10 comprising:

(a) a valve housing 15 having a fluid entrance channel 17 leading to a cylindrical valve chamber 20 within said housing 15, a fluid exit passageway 40 leading from said valve chamber 20 toward the direction of normal flow of said fluid, and a fluid drain channel 22 leading from said valve chamber 20 out of said housing in a direction inconsistent with the normal flow of said fluid;

(b) a generally cylindrical inner valve member 26 having an outer diameter slightly smaller than the inner diameter of said valve chamber 20, rotatably positioned within said valve chamber 20; said inner valve member 26 having a hollow core; a fluid inlet aperture 29 having a vertical alignment substantially horizontal with said fluid entrance channel 21 of said valve housing 40, and leading from the exterior of said inner valve member 26 to the hollow core of said inner valve member 26; a fluid drain aperture 32 having a vertical alignment substantially horizontal with said fluid drain channel 22 of said valve housing 15, and leading from the exterior of said inner valve member 26 to the hollow core of said inner valve member 26; and one or more fluid exit apertures 36 leading from the core of said inner valve member 26 to said fluid exit passageway 40 of said valve housing 15;

(c) means 13, 14, 25 for rotating said inner valve member 26 within said valve housing 15;

(d) a first continuous o-ring type seal 30 positioned between the inner surface of the valve chamber 15 and the outer surface of said inner valve member 26, substantially horizontal with said fluid inlet aperture 29 and said fluid entrance channel 21, and sealing said fluid entrance channel 21 unless said fluid inlet aperture 29 is aligned with said fluid entrance channel 21;

(e) a second continuous o-ring type seal 33 positioned between the inner surface of the valve chamber 15 and the outer surface of said inner valve member 26, substantially horizontal with said fluid drain channel 22 and said fluid drain aperture 32, and sealing said fluid drain channel 22 unless said fluid drain aperture 32 and said fluid drain channel 22 are aligned.

The first continuous o-ring type seal 30 is located in a first continuous o-ring seal groove 31 inscribed in the outer surface of said inner valve member 26; said groove having an elongated horizontal top portion 41 spanning an arc of said inner valve member 26 of about 180 angular degrees, an elongated bottom portion 42 parallel with said top portion 41 and separated from said top portion 41 by a distance larger than the diameter of said inlet channel 21, a rounded left end, and a rounded right end 44.

The second continuous o-ring type seal 33 is located in a second continuous o-ring seal groove 34 inscribed in the outer surface of said inner valve member 26; said groove 34 having an elongated horizontal top portion 45 spanning an arc of said inner valve member 26 of about 180 angular degrees, an elongated bottom portion 46 parallel with said top portion 45 and separated from said top portion 45 by a distance larger than the diameter of said drain channel 22, a rounded left end 47, and a rounded right end 48.

The first o-ring seal groove 31 is positioned generally horizontal with said fluid inlet aperture 29 and above said drain aperture 32. The second o-ring seal groove 34 is positioned generally horizontal with said drain aperture 32 and below said fluid inlet aperture 29.

The first groove 31 is positioned above said second groove 34 and a portion of an end 44 of said first groove 31 is above a portion of an opposite end 47 of said second groove 34. The upper portion 27 of said inner valve member 26 is genrally cylindrical but decreases in diameter at its top in a conical manner to its smallest outer diameter at which point it is rigidly secured to an elongated vertical shaft 25, 14 which is connected at its top to said means for rotating 13 said inner valve member 26 within said valve housing 15. The conical portion 49 of said upper portion 27 of said inner valve member 26 has a vertical channel 35 inscribed above each fluid exit aperture 36. The elongated, vertical hollow pipe 11 surrounds said elongated shaft 25 for directing the fluid exiting said valve in a desired direction.

While this invention has been described in detail with particular reference to a preferred embodiment thereof, it will be understood that variations and modifications can be effective within the spirit and scope of the invention as described hereinbefore and as defined in the appended claims.

I claim:
1. A self-draining fluid control valve comprising:
 (a) a valve housing having a fluid entrance channel leading to a cylindrical valve chamber within said housing, a fluid exit passageway leading from said valve chamber toward the direction of normal flow of said fluid, and a fluid drain channel leading from said valve chamber out of said housing in a direction inconsistent with the normal flow of said fluid;
 (b) a generally cylindrical inner valve member having an outer diameter slightly smaller than the inner diameter of said valve chamber, rotatably positioned within said valve chamber; said inner valve member having a hollow core; a fluid inlet aperture having a vertical alignment substantially horizontal with said fluid entrance channel of said valve housing, and leading from the exterior of said inner valve member to the hollow core of said inner valve member; a fluid drain aperture having a vertical alignment substantially horizontal with said fluid drain channel of said valve housing, and leading from the exterior of said inner valve member to the hollow core of said inner valve member; and one or more fluid exit apertures leading from the core of said inner valve member to said fluid exit passageway of said valve housing;
 (c) means for rotating said inner valve member within said valve housing;
 (d) a first continuous o-ring type seal positioned between the inner surface of the valve chamber and the outer surface of said inner valve member, substantially horizontal with said fluid inlet aperture and said fluid entrance channel, and sealing said fluid entrance channel unless said fluid inlet aperture is aligned with said fluid entrance channel; further provided that said first continuous o-ring type seal is located in a first continuous o-ring seal groove inscribed in the outer surface of said inner valve member; said groove having an elongated horizontal top portion spanning an arc of said inner valve member of about 180 angular degrees, an elongated bottom portion parallel with said top portion and separated from said top portion by a distance larger than the diameter of said inlet channel, a rounded left end, and a rounded right end; and said first o-ring seal groove is positioned generally horizontal with said fluid inlet aperture and above said drain aperture;
 (e) a second continuous o-ring type seal positioned between the inner surface of the valve chamber and the outer surface of said inner valve member, substantially horizontal with said fluid drain channel and said fluid drain aperture, and sealing said fluid drain channel unless said fluid drain aperture and said fluid drain channel are aligned; further provided that said second continuous o-ring type seal is located in a second continuous o-ring seal groove inscribed in the outer surface of said inner valve member; said groove having an elongated horizontal top portion spanning an arc of said inner valve member of about 180 angular degrees, an elongated bottom portion parallel with said top portion and separated from said top portion by a distance larger than the diameter of said drain channel, a rounded left end, and a rounded right end; and wherein said second o-ring seal groove is positioned generally horizontal with said drain aperture and below said fluid inlet aperture; and said first groove is positioned above said second groove and a portion of an end of said first groove is above a portion of an opposite end of said second groove; and an upper portion of said inner valve member is generally cylindrical but decreases in diameter at its top in a conical manner to its smallest outer diameter at which point it is rigidly secured to an elongated vertical shaft which is connected at its top to said means for rotating said inner valve member within said valve housing.

2. The apparatus of claim 1 wherein said conical portion of said upper portion of said inner valve member has a vertical channel inscribed above each fluid exit aperture.

3. The apparatus of claim 2 wherein an elongated, vertical hollow pipe surrounds said elongated shaft for directing the fluid exiting said valve in a desired direction.

* * * * *